US007861496B2

(12) United States Patent
May et al.

(10) Patent No.: US 7,861,496 B2
(45) Date of Patent: Jan. 4, 2011

(54) CARTON PACKAGING MACHINE HAVING TRAILING ARTICLE PUSHER ASSEMBLIES

(75) Inventors: Kevin T. May, Kennesaw, GA (US); Scott Parker, Villa Rica, GA (US)

(73) Assignee: Graphic Packaging International, Inc., Marietta, GA (US)

( * ) Notice: Subject to any disclaimer, the term of this patent is extended or adjusted under 35 U.S.C. 154(b) by 0 days.

(21) Appl. No.: 12/238,833

(22) Filed: Sep. 26, 2008

(65) Prior Publication Data

US 2009/0084075 A1   Apr. 2, 2009

Related U.S. Application Data

(60) Provisional application No. 60/995,562, filed on Sep. 27, 2007.

(51) Int. Cl.
*B65B 35/40* (2006.01)

(52) U.S. Cl. .............................. 53/252; 53/147; 53/538; 53/539; 53/542; 53/244; 53/247; 198/429

(58) Field of Classification Search .................... 53/473, 53/475, 147, 538–539, 542–543, 235, 244, 53/247, 252; 198/429; 414/790.3, 514–515
See application file for complete search history.

(56) References Cited

U.S. PATENT DOCUMENTS

| | | | | |
|---|---|---|---|---|
| 4,283,164 A | * | 8/1981 | Reaney | 414/396 |
| 4,463,541 A | | 8/1984 | Nowacki | |
| 4,649,691 A | * | 3/1987 | Buckholz | 53/53 |
| 5,561,970 A | * | 10/1996 | Edie et al. | 53/473 |

FOREIGN PATENT DOCUMENTS

| | | |
|---|---|---|
| JP | 6-48402 | 2/1994 |
| JP | 2000-355305 | 12/2000 |
| KR | 1998-0001712 | 3/1998 |

* cited by examiner

*Primary Examiner*—Christopher Harmon
(74) *Attorney, Agent, or Firm*—Womble Carlyle Sandridge & Rice, PLLC

(57) ABSTRACT

An article packaging machine includes a trailing article pusher assembly for pushing the trailing articles of a packaging production run down infeed conveyer lanes and through workstations of the packaging machine so that the trailing articles can be packaged. The pusher assembly comprises a pusher chain that is flexible in one direction to allow the chain to be coiled upon itself and generally inflexible in the other direction beyond a substantially straight configuration of the chain. A pusher block is attached to a free end of the pusher chain. The pusher chain is normally stowed on a take-up magazine beside its associated infeed lane during a packaging operation. When the trailing articles of a production run approach the workstations of the packaging machine, a gate opens to allow the pusher chain and its pusher block to be extended into the infeed lane behind the last trailing article. A drive sprocket engaged with the pusher chain is rotated to extend the chain and its pusher block into the infeed lane until the pusher block engages and exerts a pushing force on the last trailing article. Continued rotation of the drive sprocket further extends the pusher chain and pushes the trailing articles through the workstations of the packaging machine until the trailing articles are packaged. The drive sprocket is then reversed in direction to retract the pusher chain from the infeed lane and coil it in its stowed position on the take-up magazine.

14 Claims, 4 Drawing Sheets

CARTON PACKAGING MACHINE HAVING TRAILING ARTICLE PUSHER ASSEMBLIES

RELATED APPLICATIONS

Benefit of the filing date of U.S. provisional patent application Ser. No. 60/995,562, filed on Sep. 27, 2007 is hereby claimed, and the disclosure of such provisional patent application is hereby incorporated by reference in its entirety.

TECHNICAL FIELD

This disclosure relates generally to continuous motion packaging machines for packaging articles such as bottles and cans into paperboard or corrugated board cartons. More particularly, the disclosure relates to so called "clean out" systems and methods for positively conveying the last few or trailing articles of a packaging production run through a packaging machine so that these trailing articles are properly packaged and not wasted.

BACKGROUND

Article packaging machines that arrange articles, such as food and beverage cans and bottles, into groups of desired sizes and configurations, and place those article groups into paperboard or corrugated board cartons, are well known. In some types of packaging machines, the packaging operations may be performed simultaneously, while in others they may be performed sequentially, enabling the packaging of article groups into cartons at rates of hundreds of cartons per minute. It is not uncommon, for example, for packaging machines to operate at production rates of two hundred cartons per minute to three hundred cartons per minute, and higher. Packaging machines utilize a variety of techniques to group articles to be packaged depending generally on the type of machine and the kind of carton used. Some machines, for instance, place articles into a sleeve-type carton, usually by forming the sleeve from a carton blank, grouping the articles, and pushing or sliding each group of articles into an open sleeve, which is then closed at each end. Other machines may place basket-type cartons over an article group, and then close the carton along its bottom side to complete the packaging operation. Still other machines may form articles into groups, and then wrap a paperboard carton blank around each group of articles to form a completed package. These wrap-type cartons can include features that allow the opposed ends of the carton to cooperate to form a locking mechanism that holds the wrap-type carton together around each group of articles. Glue or other chemicals can be used to bind carton surfaces to one another in any type of carton, either alone or in conjunction with mechanical carton locking features, such as tabs and slots.

An important feature of most, if not all, types of carton packaging machines is the use of conveyor systems that move large numbers of articles, carton blanks, the formed cartons, and finally the packaged cartons, through the machine. Common types of article conveyor systems include a plastic or rubber endless belt-type conveyor that supports the articles and moves them downstream. Other conveyor systems may include moving pressure belts positioned on either side of a lane of articles that are supported on a stainless steel plate known as a dead plate. The pressure belts contact opposite sides of the articles and force the articles downstream across the dead plate to a downstream position of the machine. Conveyor systems of packaging machines can include chains with lugs or teeth that contact the articles as they are conveyed in order to meter the article spacing for a next step in the packaging operation. Conveying systems may also include mechanical paddles in the form of wedges driven by a chain or belt that contact the articles and thus select or "pick" a desired number of articles from a larger group, and move them downstream to the next work station.

Since speed of operation is an essential quality of article packaging machines, such machines are designed to perform certain functions simultaneously and in sync with other functions, so that the operations of the machine are as continuous as possible, and thus the name "continuous motion" packaging machines. Even during normal operation of some types of continuous motion packaging machines, however, a machine operator must stop the machine from time-to-time to reposition or remove articles, effect a component change-over, or to perform other functions. Machine stoppage, however, can seriously adversely affect machine productivity and output, and so it is advantageous to reduce the time of machine stoppage or even eliminate certain functions, if possible, that require a machine to be stopped during a production run. One operation that traditionally has caused machine stoppages and manual intervention is the cleaning out or otherwise dealing with the last few trailing articles of a production run, which do not tend to convey smoothly through the machine by themselves, as discussed in more detail below.

Packaging operations are designed considering the predictable movement of articles to be packaged along a path of travel through the machine, from an upstream end to a downstream end at a predetermined rate of speed. A sizeable quantity of articles, which can be thousands or tens of thousands of articles, that are intended to be packaged in a single production run are fed either automatically or manually onto a product intake table. This table can take the form of an active conveyor that moves the large group of articles toward working stations of the machine. Alternatively, the table may take the form of a large smooth plate of, for example, polished stainless steel or plastic, commonly referred to as a "dead plate" since the plate itself does not apply a force to move the articles downstream. In either case, the table may be, for example, 10 to 20 feet wide and as long as necessary, for example 20 feet long. The table typically tapers to a reduced width as it approaches the packaging machine in order to corral the many generally disorganized articles on the table into a reduced number of articles across the width of the table. At some point, steel or hard plastic upstanding guide rails further downstream corral the articles into the desired numbers of aligned article infeed lanes such as, for example two separate side-by-side infeed lanes of articles.

In many types of infeed systems, the articles are conveyed toward the machine by a conveyor belt that supports the articles the entire distance to the workstations of the packaging machine. When the articles are divided into, for example, two separate lanes, the conveyor may only be slightly wider than the total width of the articles, for example a common 12 ounce beverage can.

Depending upon the type of packaging machine used, the machine can include various zones, or lengths along the path of downstream article travel, where the articles have no active conveying mechanism. These zones are sometimes referred to as "dead zones" or "dead plates." It is not uncommon for certain types of continuous motion packaging machines to include two or more dead zones located between machine stations where a packaging activity is taking place. One such packaging machine is manufactured and sold, in various models, by Graphic Packaging International, Inc. of Marietta, Ga., under the brand name Marksman®. Marksman® machines are known in the trade as "wrap-type packaging machines." Wrap-type packaging machines intake articles (e.g. beverage cans), corral and divide the articles into single file side-by-side infeed lanes of a selected number, for example two separate lanes, and convey the articles along the infeed lanes to and through various work zones where packaging activity occurs. Within the work zones, the articles may be metered by, for example, pressure belts or conveyor belts, so that the articles are positioned correctly as they enter the subsequent work zones. In other work zones, a carton blank may be placed over and around an article group to "wrap" the group with the carton blank and hold the articles of the group securely together. In other work zones, moving pressure belts may engage the sides of wrapped groups of articles to move the wrapped groups away from the wrapping area and downstream to be removed from the machine.

In Marksman® brand and other packaging machines, there typically are dead zones that exist between or that are otherwise associated with certain work zones or stations where the articles are not actively conveyed. For example, there may be a dead zone or dead plate under the article lanes between the intake conveyor and the metering belts. Another dead zone may exist downstream of the metering belt, in the region of the wrapping station. Other dead zones are possible along the path of travel of the articles as they move in single file lanes throughout machine. As long as there is a constant stream of articles moving through the machine and through the various work zones, the articles are pushed across the dead zones by articles upstream behind them, which are being actively conveyed along the path. However, at the end of a production run when the last or trailing groups of articles approach the work zones of the machine, there are no articles up stream to push the remaining articles across the dead zones between work stations. As a consequence, articles can become stuck or stalled within one or more dead zones, which disrupts the packaging functions of the machine.

Under these circumstances, some machine operators simply stop the packaging machine, remove the few articles of a production run from the machine, and either discard them or use them in another run, if possible. Other operators prefer not to create such product "waste," and so utilize a system to push the final queue of articles in a production run through the machine so that they can be packaged. Typically, the packaging machine is stopped or deactivated by the operator and placed into a "clean out mode." In the clean out mode, the machine is generally caused to move to a "clean out initiating point," typically identified when the end of the product queue has passed sensors positioned adjacent the downstream end of the infeed conveyor. The machine operator then manually removes a number of articles, for example, beverage cans, up to a specific point on the infeed conveyor. The remaining number of articles are sufficient so that the articles remaining on the infeed conveyor are the correct number needed to completely fill the last carton or cartons in the production run.

With the proper number of articles remaining in the queue, the operator manually places a specially designed device, referred to as a "follower slug" or follower, on the infeed conveyor. The follower can be of any suitable construction, but typically is comprised of a synthetic material, such as an elongate nylon block, sized to be the same approximate width as the articles being packaged and including the same side edge profile as the articles (e.g. cans or bottles). The follower may be made to be weighted heavier along its rearward end section and lighter along its forward end section. The operator then may place a number of "dummy cans" in the lanes of the machine between the last article (can) in the queue and the follower. The follower is long enough to extend onto the infeed conveyor, so that as the conveyor moves forwardly, the follower is actively conveyed by the conveyor and pushes the dummy cans in the downstream direction toward, for example, the metering belt station if the machine is a Marksman® packaging machine. The dummy cans, in turn, push the articles in front of them downstream through and past the work stations such as the metering station and into the successive work stations, which, in the Marksman® machine may be the wrapping station etc. The machine then is operated to cycle the appropriate number of cartons, stopping the feeding of cartons at the appropriate time, so that the last of the cartons corresponds to the entry of the follower. At this point, the machine stops moving when the follower and its corresponding carton have reached a certain point, where a compression belt is located. The machine is then deactivated.

At this position, the machine operator opens a guard cabinet that surrounds the machine's working components, and removes the follower. The operator then restarts the machine in a "clean out mode," wherein the machine cycles the appropriate number of cartons until all cartons have been loaded and the machine stops. The operator then opens the guard doors and removes the cartons containing dummy cans, which have themselves been packaged during the clean out mode. It can be appreciated, therefore, that a substantial amount of operator effort and time is required to move the trailing articles of a production run through the machine to be packaged. This process, while effective, interrupts the machine and thus causes downtime in the machine operation, which in turn adversely affects productivity, or number of cartons per unit time.

Therefore a need exists for automation in the movement of the last or trailing group of articles of a production run through the various working stations of a packaging machine and across associated dead zones so that all articles of the production run are packaged without operator intervention or machine down time. More generally, a need exist for a method and apparatus for pushing trailing articles of a production run through packaging machines and, indeed, through other types of production machines where large number of articles are conveyed through work zones of the machine. It is to the provision of such a method and apparatus that the present invention is primarily directed.

SUMMARY

Briefly described, an apparatus and method are disclosed for conveying, by pushing, an article or a group of articles in a linear direction. The apparatus and method are particularly well suited for use in a manufacturing or packaging operation where articles or work pieces are moved along a path of travel from an upstream position to a downstream position. This includes, but is not limited to, article packaging machines such as continuous motion packaging machines used to place food or beverage containers, such as cans or bottles, into cartons made, for example, of paperboard or corrugated board. Also disclosed is a method and apparatus for stowing the article conveying apparatus when not in use.

The apparatus is described herein within the context of a preferred embodiment mounted and operating in conjunction with a Marksman® packaging machine, although the apparatus of the present invention is not intended to be limited to use only with a Marksman® machine, or any particular packaging machine. The Marksman® packaging machine includes, at its upstream end, an infeed lane conveyor having upstanding lane guides that divide articles (e.g. beverage cans) into two separate side-by-side lanes. In the described embodiment, one apparatus according to the disclosure is disposed adjacent each infeed lane for pushing trailing articles of a production run in a downstream direction in each lane toward and through work stations of the packaging machine. While one apparatus associated with one lane is described in detail herein, it will be understood that the apparatus associated with the other lane is operationally the same and is a mirror image of the first apparatus.

The apparatus comprises a pusher chain that is flexible in one direction but that is not flexible in the other direction beyond a straight configuration of the chain, i.e. the pusher chain will not "back bend." The pusher chain normally is stowed in a compact configuration next to its associated lane by being wound, in its flexible direction, onto a take-up disc or magazine. In this stowed configuration, the free end of the pusher chain extends from the take-up magazine initially in an upstream direction, around a drive sprocket, and terminates adjacent its product lane. A pusher block is attached to the end of the pusher chain and faces generally in a downstream direction toward the associated lane. The pusher block has a width that is about the same as the width of articles (e.g. beverage cans) to be conveyed along the lane, but is elongated and configured to maintain its orientation within the lane as it moves along the lane between the lane's divider plates.

An opening is formed in the side plate of the lane in front of the pusher block and is sized to allow the pusher block and pusher chain to enter the lane through the opening. A hinged gate closes the opening during normal operation of the machine, and may be opened at the appropriate time with a pneumatic cylinder controlled by a machine controller to allow the pusher block and pusher chain to enter the lane through the opening. This normally occurs at the end of a production run when the last few trailing articles of the production run are in the lanes and approaching working stations of the machine. At this point, an operator may stop the machine momentarily and remove any "excess" cans that do not make up a full container group at the end of a production run. The machine is then instructed to continue its operation in a clean out mode. The gate is opened and the drive sprocket is rotated to extend the pusher chain and pusher block through the opening and into the lane behind the last article in the lane.

As the drive sprocket continues to rotate, the pusher block, pushed by the chain, falls in behind and engages the last article of the production run. Since the pusher chain does not back bend, it assumes a straight relatively rigid configuration as it enters the lane and thereby pushes the pusher block in a downstream direction within the lane. The drive sprocket is driven by an electric motor through a slip clutch at a rate that normally moves the pusher block along the lane at a speed just slightly faster than the speed at which articles normally are conveyed along the lanes. When the pusher block enters the lane and engages the last article of the production run, the slip clutch begins to slip slightly with a preselected slippage friction. The slippage friction is selected so that the pusher block bears against the last article with a predetermined constant force sufficient to push the trailing group of articles through working stations of the machine and particularly across their associated dead zones so that all of the articles are moved from station to station (e.g. from a metering station, to a wrapping station, etc.).

Magnets are embedded in the pusher blocks so that pusher blocks are magnetically attracted to each other. When the central divider plate and the side plates of the lanes end upstream of the work stations of the machine (e.g. the wrapping station), the two pusher blocks engage one another and are magnetically attracted to each other. This holds the pusher blocks together and in the proper position as they move in unison through the work stations pushing articles in front of them. Holding the pusher blocks magnetically together also prevents the pusher chains from bending or curling up, which might otherwise occur.

The pusher blocks continue to push the last few articles through the work stations of the packaging machine and across associated dead zones until the last articles of the production run are packaged. The drive sprocket is then driven in a reverse direction, which retracts the pusher chain and pusher blocks back upstream through the lanes until the pusher block is withdrawn from its lane through the opening in the divider plate. As this occurs, the pusher chain progressively winds up about itself on the take-up magazine into its stowed position. In this regard, the take-up magazine also is driven, preferably by the same drive motor that drives the drive sprocket, to assist the chain to wind up onto the take-up magazine. When the pusher chain and pusher block are completely retracted, the gate is closed over the opening in the side plate and the lane is configured for the next production run.

Thus an improved method and apparatus is disclosed for automatically conveying through a packaging machine the last few trailing articles of a production run. The apparatus operates automatically without the requirement that the packaging machine be shut down or that ancillary items such as follower slugs and dummy cans be manually placed behind the last article of the production run. The need to retrieve the packaged dummy cans manually afterwards is eliminated and the apparatus automatically retracts and stows itself after the production run in preparation for a subsequent production run. These and other objects, features, and advantages of the disclosed method and apparatus will become more apparent upon review of the detailed description set forth below, taken in conjunction with the accompanying drawing figures, which are briefly described as follows.

DETAILED DESCRIPTION

Figure 1:
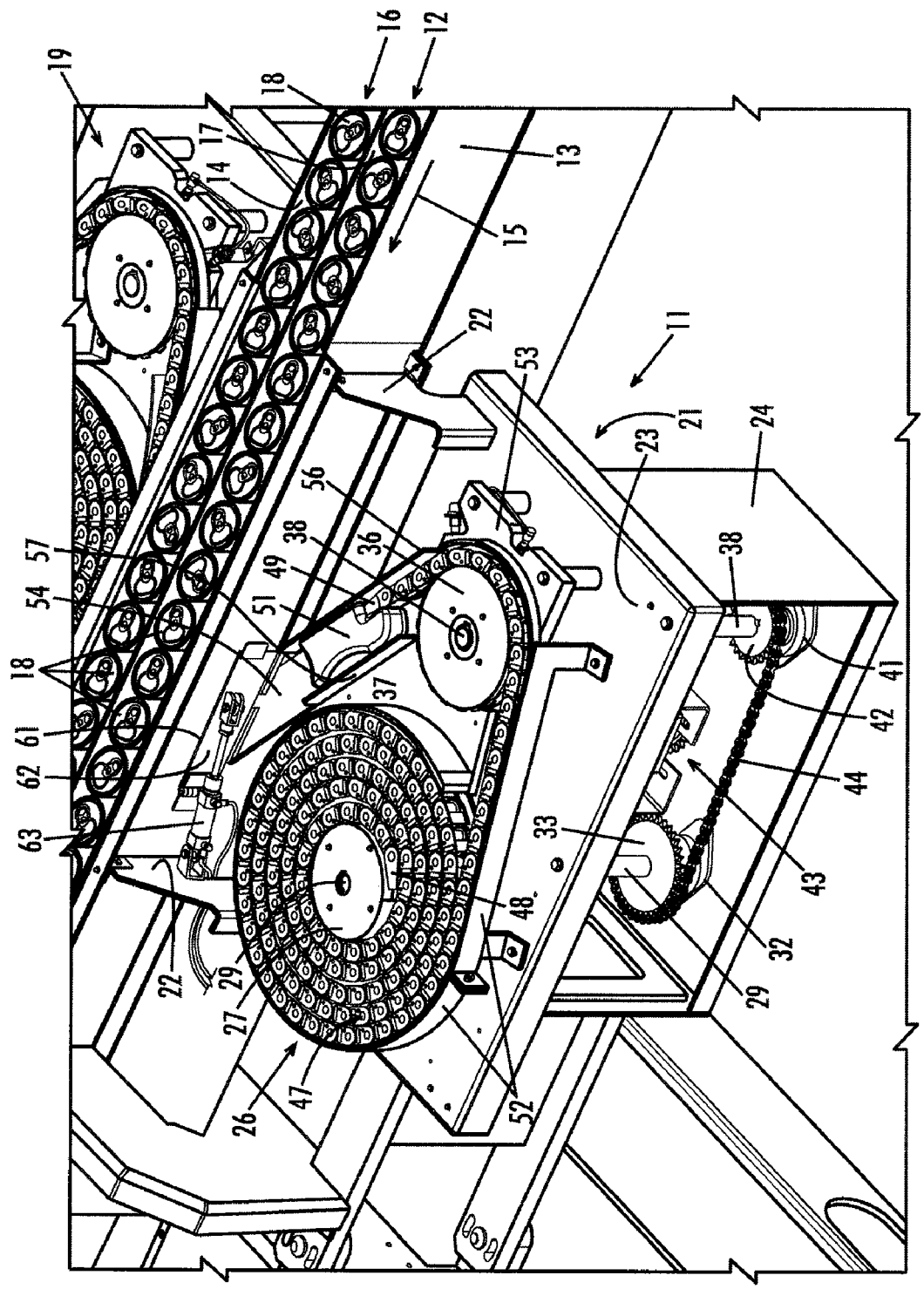
FIG. 1 is a perspective view of a portion of a packaging machine incorporating trailing article pusher assemblies that embody principles of the invention in a preferred form.

Referring now in more detail to the drawing figures, wherein like reference numerals identify like parts throughout the several views, FIG. 1 illustrates a trailing article pusher assembly that embodies principles of the invention in a preferred form. The assembly 11 is seen to be mounted to an upstanding side plate 13 of an article infeed conveyor by means of brackets 22, although other mounting structures can be used. The infeed conveyor in the illustrated embodiment comprises two article lanes 12 and 16 defined by upstanding side plates 13 and 17 and a central divider plate 14. The lanes are sized to contain and convey beverage cans 18 in a downstream direction 15 toward the workstations of a packaging machine such as, for example, the Marksman® packaging machine mentioned above. It will be understood, however, that the invention is not limited to any particular packaging machine or, indeed, to the packaging of beverage cans, but instead is applicable to any manufacturing operation where articles are conveyed along a path toward workstations.

Figure 2:
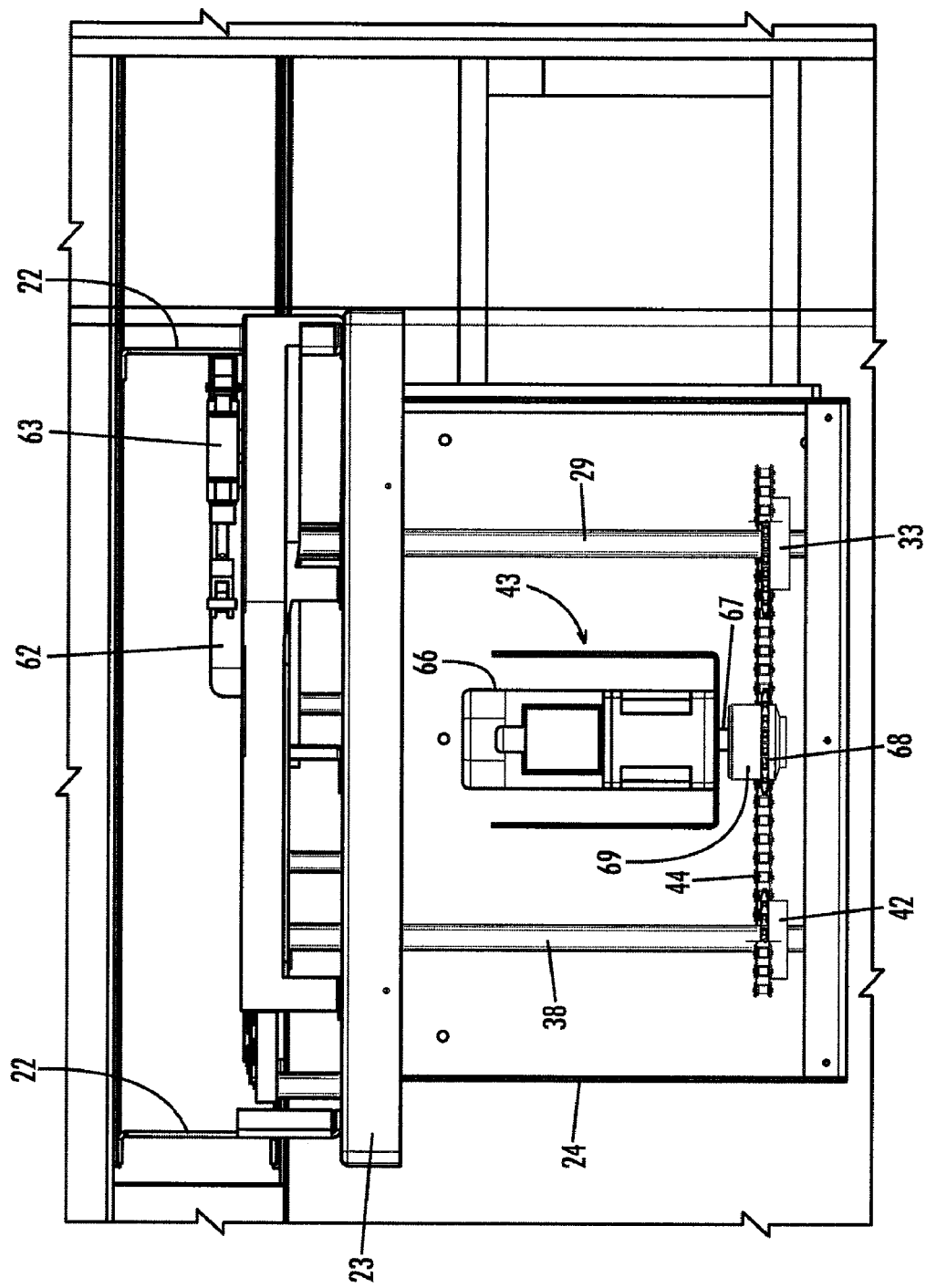
FIG. 2 is a side elevational view of the pusher assembly shown in FIG. 1 illustrating the drive motor, drive sprockets, and slip clutch of the assembly.

In the illustrated embodiment, the beverage cans 18 are contained within two side-by-side lanes 12 and 16 and are conveyed along the lanes in the downstream direction 15 by means of an infeed conveyor belt 72 (FIG. 3), on which the beverage cans sit. A second trailing article pusher assembly 19 is mounted adjacent to the second lane 16 and functions identically to the first article pusher assembly 11, except in mirror image fashion. Accordingly, only the assembly 11 will be described in detail with respect to FIG. 1, with the description applying equally to the pusher assembly 19. The second pusher assembly 19 is illustrated in FIG. 2, and described below, and that description applies equally to the pusher assembly 11 of FIG. 1.

The trailing article pusher assembly 11 comprises a metal chassis 21 having a top plate 23 and drive housing 24 disposed beneath the top plate 23. A take-up disk or take-up magazine 26 has a disk-shaped platter 28 (FIG. 4) projecting outwardly from a central hub 27. The central hub 27 is secured to the end of a vertical driveshaft 29 that extends vertically through the top plate 23 to a lower end that is rotatably journaled within a bearing block 32 on the bottom of the drive housing 24. A second bearing block (not visible in FIG. 1) is secured to the top plate and the vertical driveshaft 29 is rotatably journaled within the second bearing block. It will thus be seen that the take-up magazine 26 is rotatably mounted to the chassis 21 so that it can rotate about its axis in a substantially horizontal plane.

A drive sprocket 36 is disposed adjacent the take-up magazine 26. The drive sprocket 36 is formed with peripheral teeth 37 and is secured to the end of a vertical driveshaft 38, which extends downwardly through the top plate 23 to a bottom end that is rotatably journaled within a bearing block 41. The driveshaft 38 also is rotatably journaled within a second bearing block secured to the top plate 23 but this second bearing block is not visible in FIG. 1. Thus, as with the take-up magazine 26, the drive sprocket 36 is rotatably mounted to the chassis 21 so that it can rotate about its axis in a substantially horizontal plane that is substantially parallel with the plane in which the take-up magazine rotates.

A sprocket 33 is secured on the vertical driveshaft 29 of the take-up magazine 26 within the drive housing 24. Similarly, a sprocket 42 is mounted on the vertical driveshaft 38 of the drive sprocket 36 within the drive housing 24. A drive motor assembly 43 is mounted within the drive housing 24 and includes a motor sprocket 68 (FIG. 2). The sprockets 33, 42, and 68 are positioned so that they all lie in substantially the same plane within the drive housing. A drive chain 44 extends around sprockets 33, 42 and 68 such that, upon activation of the motor of assembly 43, the chain 44 drives and rotates both the take-up magazine 26 and the drive sprocket 36 in the same rotational direction. The relative diameters of the sprockets 33 and 42 are selected to rotate the take-up magazine 26 and the drive sprocket 36 at respectively different preselected rotational speeds with respect to each other for purposes described in more detail below.

A pusher chain 47 is shown in its stowed position coiled about itself on the take-up magazine 26. The pusher chain 47 has a proximal end 48 that is attached to the central hub 27 of the take-up magazine and a distal end 49. The pusher chain rests atop the disc-shaped platter 28 of the take-up magazine. Guide rails 52 extend around the periphery of the take-up magazine 26 and project tangentially from the outer side thereof to confine and help guide the pusher chain 47 as it winds and unwinds during operation, as detailed below. A distal end portion of the chain 47 extends out of the take-up magazine 26 in a generally downstream direction of the packaging machine and extends around and engages the teeth 37 of the drive sprocket 36. The distal end 49 of the pusher chain 47 is oriented generally in a downstream direction of the packaging machine toward the upstanding side plate 13 of the lane 12. A pusher block 51 is secured to the distal end 49 of the pusher chain 47 and also is oriented generally toward the upstanding side plate 13 of lane 12. The pusher block 51 may be made of a low friction polymeric material such as nylon, or any other suitable material so long as it can slide relatively freely against various surfaces of the packaging machine.

The pusher chain 47 is shown in FIG. 1 in its stowed position with the chain fully coiled about itself filling the take-up magazine 26 and with the pusher block 51 resting in a retracted position on a pusher block platform 54. The pusher chain 47 and pusher block 51 normally are arranged in this stowed position during a packaging production run wherein large numbers of beverage cans 18 are being conveyed along lanes 12 and 16 from an upstream intake table toward downstream workstations of the packaging machine such as, for example, the metering station and the packaging station.

Figure 4:
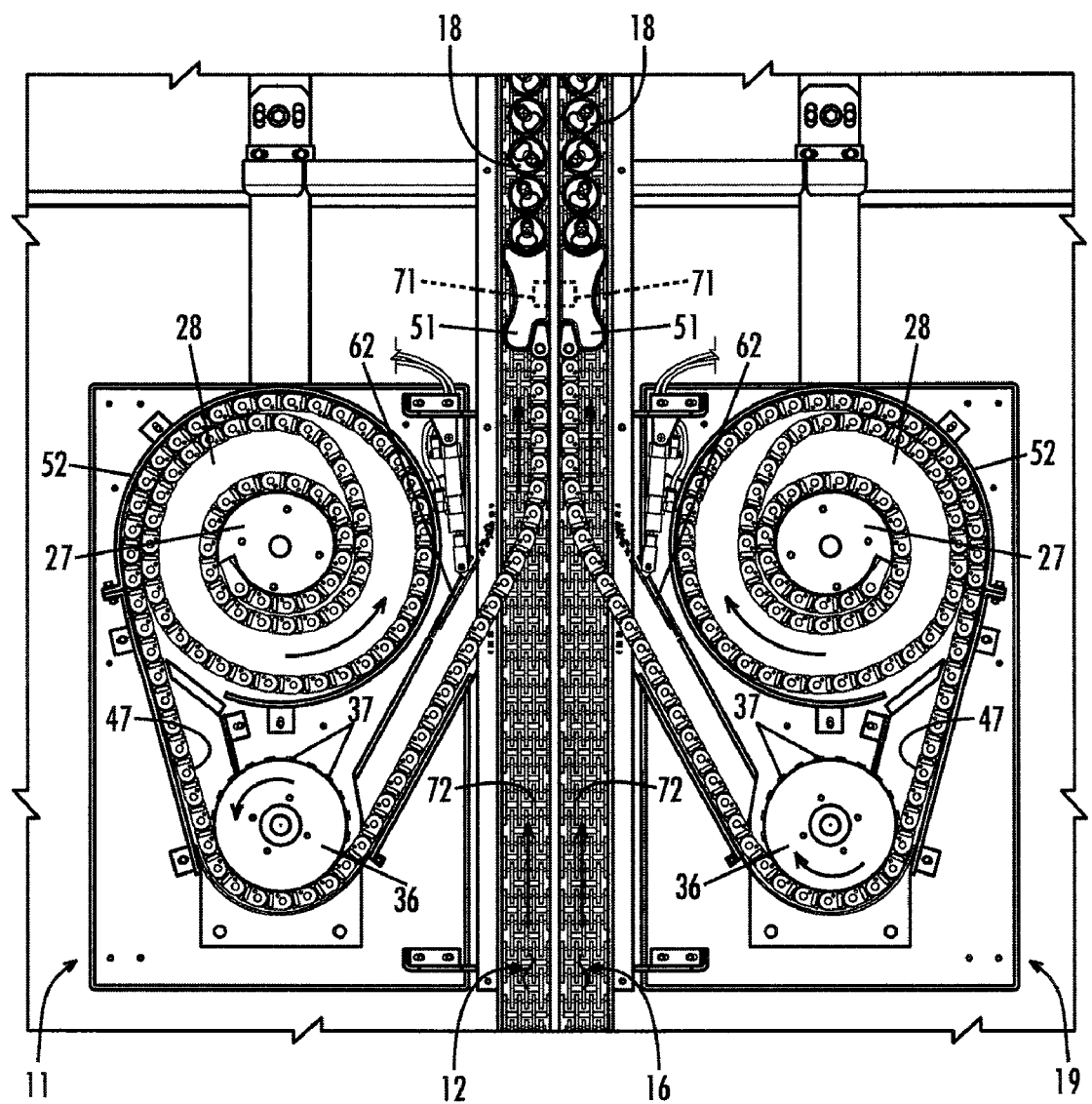
FIG. 4 is a top plan view of a portion of a packaging machine with trailing article pusher assemblies with the pusher assemblies activated and extending their pusher chains and pusher blocks into the lanes to push trailing articles along the lanes and toward workstations of the packaging machine.

An opening 61 is formed in the upstanding side plate 13 at the distal end of the pusher block platform 54. A hinged gate 62 normally closes the opening 61 during operation of the packaging machine so that there is no discontinuity in the upstanding side plate to cause a possible jam. A pneumatic or hydraulic cylinder 63 is connected to the hinged gate 62 and can be selectively activated to move to an extended position as shown in FIG. 1, to close the gate or to a retracted position as shown in FIG. 4 to open the gate. When the gate 62 is opened, the opening 61 in the side plate 13 is exposed so that the pusher block 51 and pusher chain 47 can be extended, by rotation of the drive sprocket 36, through the opening and into the lane for pushing beverage cans in a downstream direction along the lane.

The pusher chain 47 is of a special "uni-flexible" construction, meaning that it is flexible in one direction so that it can be coiled upon itself in that direction as shown in FIG. 1, but that it is generally inflexible beyond a linear or straight configuration of the chain in the opposite direction. Thus, when uncoiled and flexed into a linear configuration, the chain is relatively stiff so long as it remains linear. The pusher chain can thus be used as if it were a rod to push against items at its distal end. Chains of such a construction are commonly used as cable ways to contain and route groups of electrical cables in industrial and scientific machinery and equipment. These cable ways typically exhibit the desired properties described above, and have links that can be engaged by the teeth 37 of the drive sprocket 36 for extending and retracting the chain. It has been found that a series 10 E2 "mini" New cable way chain available from the Igus corporation of East Providence, R.I. is particularly suitable for use as a pusher chain in the present invention. However, other chain configurations and types may be used as dictated by application specific requirements and conditions.

FIG. 2 is a side elevational view into the drive housing 24 of the trailing article pusher assembly. While FIG. 2 is a view into the drive housing 24 of pusher assembly 19, which is mounted adjacent to article conveyor lane 16, it will be understood that the drive housing of pusher assembly 11 is configured and functions in an identical albeit mirror image manner.

Within the drive housing 24, driveshaft 29, the upper end of which is attached to the central hub 27 of the take-up magazine 26, extends downwardly to a bearing block 32 (FIG. 1) and is provided with sprocket 33. Similarly, driveshaft 38, the upper end of which is attached to drive sprocket 36, extends downwardly within the drive housing 24 to be journaled within bearing block 41 (FIG. 1) and is provided with sprocket 42 as shown. The drive motor assembly 43 is mounted within the drive housing 24 by means of a bracket 45 and includes a reversible controllable electric motor 66 having a vertically oriented motor shaft 67. A slip clutch 69 is mounted to the end of the motor shaft 67 and a sprocket 68 is mounted to the slip clutch 69 and is driven thereby upon activation of the electric motor 66.

The slip clutch 69 is constructed such that, upon activation of the motor 66, the slip clutch drives the sprocket 68 and, through the drive chain 44, the sprockets 33 and 42. As is the nature of a slip clutch, when a predetermined resistance to the rotation of the shafts is encountered, the slip clutch 69 begins to slip with a predetermined slippage friction and thereby maintains a constant rotational force or torque on the sprockets 33 and 42 and, accordingly, driveshafts 29 and 38. This provides unique automatic positioning and automatic pushing force functions in the present invention, as described in more detail below. In the preferred embodiment, a model ROBA slip clutch available from the Mayr company of Waldwick, N.J. has been found to be found to function admirably; however, other slip clutches and other mechanisms may be used.

Referring again to FIG. 1, it will be seen that with the just described drive mechanism, activation of the drive motor 66 in one rotational direction, e.g., counterclockwise in FIG. 1, causes the drive sprocket 36 and take-up magazine 26 to rotate in a counterclockwise direction as viewed in FIG. 1. This causes the pusher chain 47 to begin to unwind from the take-up magazine 26 and, simultaneously, to be extended by the teeth 37 of the drive sprocket 36 toward the infeed lane 12 of the packaging machine. The ratio of the diameters of sprockets 33 and 42 are chosen so that upon initial extension of the chain by rotation of the drive sprocket 36, the chain is paid out of the take-up magazine at the same rate that it is being extended by the drive sprocket 36. As the chain progressively unwinds from the take-up magazine 26, the rotational ratio between the take-up magazine 26 and the drive sprocket 36 causes the chain to track toward and ride around the guide rails 52 at the periphery of a take-up magazine. In this way, the pusher chain 47 is always unwound from the take-up magazine 26 at the same rate that it is being extended outwardly by the drive sprocket 36. This, in turn, prevents the chain from curling up or becoming tangled within the pusher assembly 11.

Figure 3:
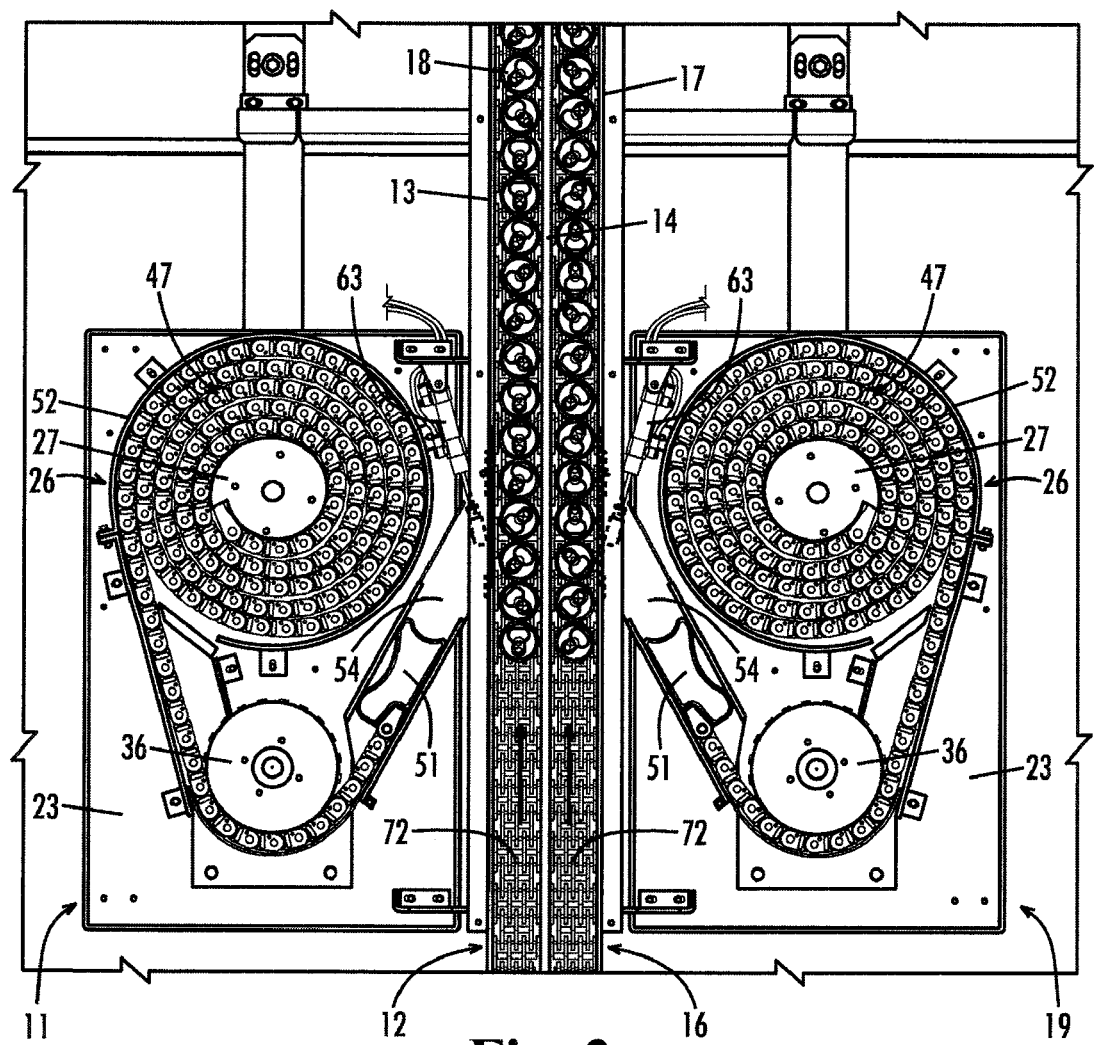
FIG. 3 is a top plan view of a portion of a packaging machine with tailing article pusher assemblies with the pusher assemblies in their stowed configurations and with the final articles (cans in this illustration) of a production run moving downstream in two side-by-side lanes.

FIGS. 3 and 4 illustrate operation of the trailing article pusher assemblies of the present invention to push the trailing group of articles of a production run into and through the workstations of a packaging machine. The trailing articles of a packaging production run, in this case beverage cans 18, are seen being conveyed in a downstream direction within two side-by-side lanes 12 and 16. The lanes 12 and 16 are formed and defined by upstanding side plates 13 and 17 and by divider plate 14. A conveyor belt 72, on which the cans sit, moves in the downstream direction to convey the beverage cans toward workstations of the packaging machine, where they are metered, grouped, and packaged into cartons. As mentioned above, within the workstations, the beverage cans generally are organized and positively conveyed through the workstations by, for example, opposed pressure belts and the like. However, between workstations and elsewhere within the packaging machine, there typically are dead zones where there are no mechanisms to convey the beverage cans positively across the dead zones to successive stations. Normally during the production run, the downstream force provided by the upstream beverage cans of the production run, which are positively conveyed, is sufficient to push downstream beverage cans across these dead zones. However, at the end of a production run, as depicted in FIG. 3, this force is progressively reduced because the number of beverage cans within the lanes becomes progressively smaller. Also, when the last of the trailing cans moves through a workstation, there is no longer upstream cans being positively conveyed to move the cans to the next workstation.

FIG. 3 shows the trailing articles of a production run approaching a predetermined upstream position within their lanes 12 and 16. The trailing article pusher assemblies 11 and 19 are in their stowed states in which they are normally configured during a production run. Specifically, the pusher chains 47 of the assemblies are fully coiled around themselves on their take-up magazines 26. The end portions of the pusher chains project tangentially from the take-up magazines and extend around and engage with the drive sprockets 36. Pusher blocks 51, which are attached to the distal ends of the pusher chain, are disposed in their stowed positions on their pusher block platforms 54. Finally, pneumatic cylinders 63 are in their extended configurations so that the hinged gates 62 are closed over and cover the openings 61 in the upstanding side plates 13 and 17 (see FIG. 1). With the pusher assemblies 11 and 19 in this stowed configuration, the packaging machine operates in the manner that it normally would during a packaging production run.

At the end of the production run, when the last of the trailing beverage cans of the run reach a predetermined position in the lanes 12 and 16, the operator of the machine may stop the machine momentarily in order to remove, if necessary, a sufficient number of beverage cans to insure that the number of remaining cans is an even multiple of the number of cans packaged into each carton. The packaging machine may then be restarted in a clean-out mode, during which the trailing article pusher assemblies are activated to push the trailing articles on through the packaging machine, as illustrated in FIG. 4.

FIG. 4 illustrates operation of the trailing article pusher assemblies during the clean-out mode operation of the packaging machine. Upon activation, the pneumatic cylinders, controlled by the machine controller, are retracted to hinge the gates 62 to their open positions aligned with a side wall of the pusher block platforms 54 (FIG. 3). This exposes the openings 61 in the side walls 13 and 17 of the infeed lanes 12 and 16. The drive motors 66 (FIG. 2) are then activated by the machine controller to rotate the drive sprockets 36 and the hubs 27 and platters 28 of the take-up magazines in the directions of the arrows in FIG. 4. The teeth 37 of the drive sprockets 36 engage the pusher chains 47 to extend the pusher chains and their pusher blocks through the openings 61 and into the infeed lanes 12 and 16 behind the trailing beverage cans of the production run. At the same time, the rotating take-up magazines pay out the pusher chains at the same rate that the drive sprockets are extending the pusher chains and pusher blocks into and along the infeed lanes to prevent kinking and tangling of the pusher chains. This condition is insured by the ratios of the diameters of the sprockets 33 and 42 (FIG. 1), which, as mentioned above, are predetermined so that the rotational speed of the take-up magazine at is periphery is the same as the rotational speed of the drive sprocket 36 at its periphery. Since the rotational speed of the take-up magazine necessarily is less toward the hub 27, this causes the pusher chains to track to and pay out from the peripheries of the take-up magazines as illustrated in FIG. 4 to prevent kinks and tangles as the pusher chains are extended.

As the pusher chains 47 are extended along the infeed lanes 12 and 16, the pusher blocks 51 fall in behind and engage the last beverage can of the trailing cans in each lane. The pusher blocks thus begin to push the trailing beverage cans in a downstream direction toward the workstations of the packaging machine. Significantly, the speed of the drive motor 66 and the diameters of the sprockets 33, 42, and 68 (FIG. 2) are predetermined so that the pusher chains 47 and their pusher blocks 51 are extended at a rate that is slightly greater than the rate at which the beverage cans normally move along the infeed lanes and through the workstations of the packaging machine. Thus, as the pusher blocks push the trailing beverage cans, the slip clutch 69 (FIG. 2), through which the drive motor 66 drives the sprocket 68, continually slips with a predetermined slippage friction. This has three beneficial effects. First, the pusher blocks are automatically positioned as they move along to maintain engagement with the last of the trailing cans as the cans and pusher blocks move through the various workstations of the packaging machine. Second, the slippage friction provided by the slip clutch insures that the force with which the pusher blocks push the trailing beverage cans is appropriate and sufficient to push all of the trailing cans through the machine and further that the force remains constant throughout the packaging of all of the trailing beverage cans. Third, the slip clutch insures that the pusher blocks do not damage the cans or other articles being pushed by applying a pushing force that is too great.

Each of the pusher blocks has embedded therein a magnet 71 on the side adjacent the divider plate. As the pusher blocks move along the infeed lanes, these magnets are not normally attracted to the divider plate, which typically is made of stainless steel. In the lanes, the pusher blocks are maintained in line and in their proper orientations by the divider plates and the side plates. However, when the divider plate and side plates terminate upstream of the workstations of the packaging machine, the pusher blocks come into engagement with each other as they move further into and through the workstations. The magnets 71 in the pusher blocks then are attracted to each other, which holds the pusher blocks securely together. This, in turn, keeps the pusher blocks properly aligned as they push the trailing articles through the workstations and across associated dead zones within the packaging machine. The pusher chains are also prevented from flexing in their flexible directions toward the outside of the paths of travel because of the magnetically coupled pusher blocks. Thus, the pusher chains retain their straight configurations throughout the machine to provide constant pushing force on the pusher blocks and the trailing articles.

When all of the trailing beverage cans have been moved through the workstations of the packaging machine and successfully packaged into cartons, the pusher chain and blocks stop and the packaging machine continues to run until all of the packaged product is discharged from the machine. The machine controller then instructs the drive motors 66 of the pusher assemblies 11 and 19 to reverse directions. The pusher chains and pusher blocks begin to be retracted back upstream out of the workstations and back up the infeed lanes until the pusher blocks exit the infeed lanes through the openings 61 and move to their stowed positions on the pusher block platforms 54. During this process, the pusher chains loosely wind about themselves within the take-up magazines until the end of the process, whereupon the coiled pusher chains are tightened in the coiled configurations by the movement of the peripheral portions of the take-up magazines. The pneumatic cylinders are then extended to close the hinged gates over the openings into the infeed lanes and the trailing article pusher assemblies are once again in their stowed conditions ready for the next production run of the packaging machine.

The invention has been described herein in terms of preferred embodiments and methodologies considered to be the best mode of carrying out the invention. It will be clear to skilled artisans, however, that a wide variety of substitutions, variations, and modifications might well be made to the illustrated embodiments within the scope of the invention. For example, while a pusher chain, flexible in one direction and substantially inflexible in the other, is illustrated as the preferred pusher member, equivalent substitutes might include semi-rigid elements similar to electrician's fish tape and other elements. Means of storing the pusher elements and pusher block when not in use other than the illustrated take-up magazine might be employed equivalently. Mechanisms other than a drive sprocket might be used to extend the pusher element and various drive mechanisms other than the illustrated motor, sprocket, and slip clutch assembly might be substituted, These and other additions, deletions, and modifications might well be made by those of skill in the art without departing from the spirit and scope of the invention as set forth in the claims.

What is claimed is:

1. A packaging machine for arranging articles into groups and packaging the groups of articles into cartons, said packaging machine comprising:
   at least one infeed lane extending in a downstream direction toward workstations of the packaging machine, the infeed lane being defined between a pair of spaced upstanding plates and being sized to confine articles in an abutting single file configuration as the articles move along the infeed lane;
   a conveyor disposed beneath the infeed lane for supporting the articles and moving the articles progressively along the infeed lane;
   a trailing article pusher assembly adjacent the infeed lane;
   the trailing article pusher assembly including an elongated flexible pusher element and a drive mechanism configured to advance the elongated flexible pusher element into the infeed lane between the upstanding plates and to extend the pusher element progressively along the infeed lane behind a trailing article of the abutting articles in the lane to push the trialing article and articles downstream thereof toward and through workstations of the packaging machine,
   the pusher element comprises an elongated chain;
   and wherein the elongated chain is flexible in one lateral direction and generally inflexible beyond a substantially straight configuration of the elongated chain in the opposite lateral direction.

2. The packaging machine of claim 1 and wherein the chain has a free end that moves into and through the infeed lane and further comprising a pusher block attached to the free end of the chain, the pusher block being sized and configured to ride within the infeed lane and engage a trailing article therein as the chain is extended into the lane.

3. The packaging machine of claim 2 and wherein said trailing article pusher assembly further comprises a take-up magazine and wherein said elongated chain is normally coiled in its flexible direction on the take-up magazine and progressively uncoils from the take-up magazine as the chain is advanced into the infeed lane.

4. The packaging machine of claim 3 and wherein the drive mechanism includes a drive sprocket engaging the chain and a motor coupled to the drive sprocket, activation of the motor in one direction rotating the drive sprocket to extend the chain and pusher block into and along the infeed lane.

5. The packaging machine of claim 4 and wherein the motor is coupled to the drive sprocket through a slip clutch.

6. The packaging machine of claim 5 and wherein the motor is also coupled to the take-up magazine to rotate the take-up magazine as the drive sprocket is rotated.

7. The packaging machine of claim 6 and wherein the coupling between the motor and the take-up magazine drives the take-up magazine at a different rotational rate than the drive sprocket.

8. A pusher assembly for pushing a group of abutting articles along a path of travel by asserting a pushing force on a trailing article of the group, the pusher assembly comprising:

a take-up magazine disposed adjacent the path of travel;

a flexible pusher member having an end and being progressively movable between a stowed configuration at least partially coiled onto the take-up magazine and an extended configuration extending along the path of travel;

the end of the flexible pusher being configured to engage and push the trailing article along the path of travel as the flexible pusher member progressively moves between its stowed configuration and its extended configuration;

the flexible pusher member comprises an elongated chain; and wherein the elongated chain is flexible in one lateral direction for coiling onto the take-up magazine and generally inflexible beyond a substantially straight configuration in the opposite lateral direction for extending in a substantially rigid state along the path of travel and pushing articles therealong.

9. A pusher member as claimed in claim 8 and further comprising a pusher block attached to the end of the chain.

10. A pusher member as claimed in claim 8 and further comprising a drive mechanism for moving the chain from its stowed configuration progressively toward its extended configuration.

11. A pusher member as claimed in claim 10 and wherein the drive mechanism comprises a selectively rotatable drive sprocket engaging the chain.

12. A pusher mechanism as claimed in claim 11 and wherein the drive mechanism comprises a motor coupled to the drive sprocket.

13. A pusher mechanism as claimed in claim 12 and wherein the motor is coupled to the drive sprocket through a slipping coupler.

14. A pusher mechanism as claimed in claim 13 and wherein the slipping coupler is a slip clutch.

* * * * *